United States Patent

Harris

[15] 3,666,312
[45] May 30, 1972

[54] MOBILE STORAGE BOX

[72] Inventor: Richard T. Harris, 1330 Indianapolis Blvd., Lake County, Ind. 46324

[22] Filed: Apr. 27, 1970

[21] Appl. No.: 32,164

[52] U.S. Cl..............................296/1 R, 34/237, 134/115, 134/201, 220/29, 220/69, 248/137, 296/137 B, 312/229, 312/249
[51] Int. Cl......................................................B62d 39/00
[58] Field of Search............296/1 R, 28 D, 100, 137 B; 280/79.2; 220/29, 69; 312/229, 249, 251, 317, 324; 248/137; 34/201, 237, 238; 134/115, 135, 201

[56] References Cited

UNITED STATES PATENTS

| | | | |
|---|---|---|---|
| 3,450,431 | 6/1969 | Tyler | 296/100 |
| 2,903,219 | 9/1959 | Ingham | 248/137 |
| 3,233,913 | 2/1966 | Brown | 224/29 X |
| 3,159,420 | 12/1964 | McGrossen | 296/28 D |
| 2,002,993 | 5/1935 | Ehrick et al | 296/100 X |
| 3,074,583 | 1/1963 | Martinich | 220/17 X |
| 1,630,393 | 5/1927 | Ledden | 248/137 X |
| 669,368 | 3/1901 | Melton | 248/137 X |
| 2,795,349 | 6/1957 | Cawood | 220/29 X |
| 2,655,420 | 10/1953 | Hadley | 312/317 R X |

Primary Examiner—Benjamin Hersh
Assistant Examiner—Leslie J. Paperner
Attorney—Walter Leuca

[57] ABSTRACT

This application discloses a vehicularly movable trailer for storing an oil rake of the type used for containing pollutants in water such as an oil slick. The storage box body of this invention is pivotally supported on a drawbar frame for tilting toward either side. The top of the box is provided with hinged doors having vent means and a screened bottom which supports the stored oil rake. The cover doors are further provided with a plurality of hinged leg members which have extension members pivotally connected to distal ends of the leg members which serve as side posts when pivotally raised from the leg members for supporting sections of a skimmer hose. The leg members of the cover doors are pivotally swung out to support the open side of the door in platform position which facilitates rapid removal of the oil rake.

4 Claims, 9 Drawing Figures

INVENTOR.
RICHARD T. HARRIS
BY
Walter Leuca
ATTORNEY

INVENTOR.
RICHARD T. HARRIS
BY Walter Leuca
ATTORNEY

MOBILE STORAGE BOX

BACKGROUND OF THE INVENTION

This invention relates generally to storage apparatus and more particularly to a mobile storage apparatus.

This invention in its broad aspects is a storage box for housing what is known as an oil rake or oil boom which is used to contain pollutants in a body of water. When a body of water is polluted with floating debris and especially spillage therein of oil, an oil rake is used to contain the pollutants and thereby prevent it from spreading with the ebb and flow of the water. The conventional oil rake serves as the floating dam and generally comprises a plurality of cylindrical float sections connected to and dependingly supporting a flexible plastic skirt. When not in use, the oil rake is compactly folded and placed in a box for storage. These storage boxes containing the oil rakes are placed at strategic locations along a slip of waterway for ready use. It frequently occurs, however, that spillage such as oil into the water occurs at locations distant from where the storage box is located. It is then necessary to load the storage box on a truck for transportation to the oil spillage area, usually requiring crane lifting means for the storage box since they are generally large and heavy. Since the storage boxes of the prior art are not provided with drainage means, the oil rake must be washed prior to being replaced in the prior art storage box.

SUMMARY OF THE INVENTION

Accordingly, I have invented a tiltable storage box mounted on a draw frame which is provided with wheels to allow rapid portability of the oil rake from its parked station to the site of use merely by connecting the apparatus of my invention to the trailer hitch of a motor vehicle. The storage apparatus of my invention is tiltable and provided with cover doors which when opened serves as a platform to allow easy and rapid removal of the oil rake from the storage box. The storage apparatus of my invention is also adapted to carry accessories such as a skimmer unit and the hose therefor. The storage apparatus of my invention is further provided with

SUMMARY OF THE INVENTION

Accordingly, I have invented a tiltable storage box mounted on a draw frame which is provided with wheels to allow rapid portability of the oil rake from its parked station to the site of use merely by connecting the apparatus of my invention to the trailer hitch of a motor vehicle. The storage apparatus of my invention is tiltable and provided with cover doors which when opened serves as a platform to allow easy and rapid removal of the oil rake from the storage box. The storage apparatus of my invention is also adapted to carry accessories such as a skimmer unit and the hose therefor. The storage apparatus of my invention is further provided with a screen bottom so that after use the sections of the oil rake may immediately be deposited in the storage box and moved to a cleaning station where proper facilities are available to clean and rinse the oil rake while in the storage box. The means provided for draining also serve as the vent means for drying the oil rake after cleaning so no further handling of the oil rake is required.

Other objects and advantages of my invention will become more apparent after a careful study of the following detailed description having reference to the accompanying drawing which illustrates the preferred embodiment thereof.

DESCRIPTION OF THE PREFERRED EMBODIMENT

Figure 1:
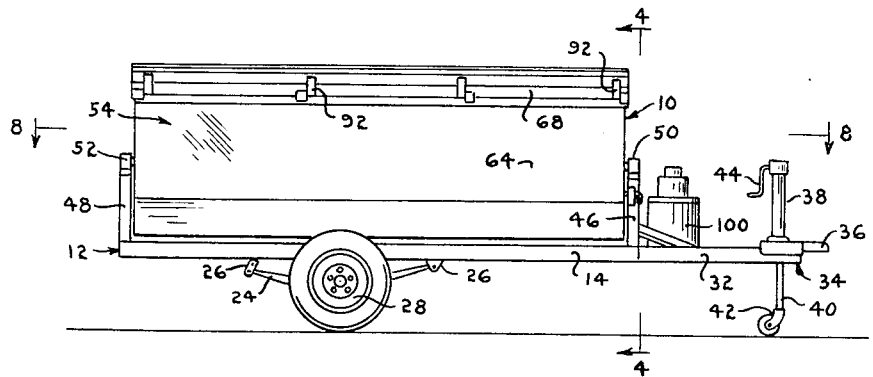
FIG. 1 is a side elevation of the oil rake storage trailer of my invention.
Figure 2:
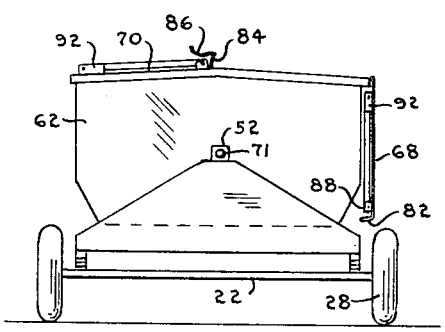
FIG. 2 is a rear end elevation of my invention showing one cover door in the open position.
Figure 3:
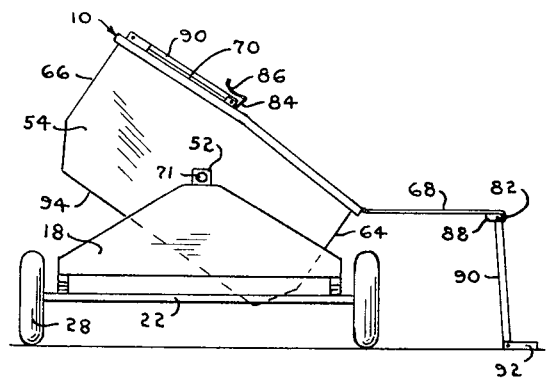
FIG. 3 is another rear end elevation showing the storage box in tilt position and one of the cover doors in open position.
Figure 6:
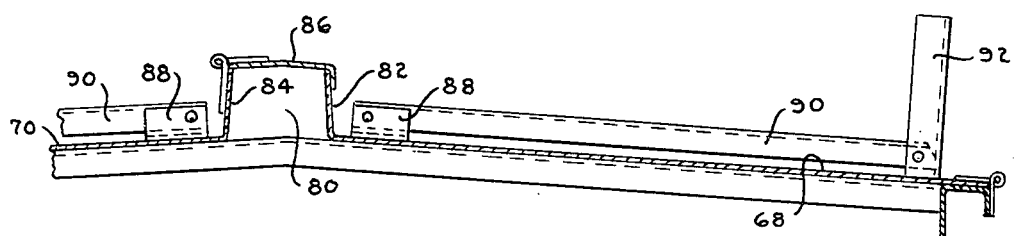
FIG. 6 is a cross section view of FIG. 5 taken along lines 6—6 of FIG. 5.
Figure 4:
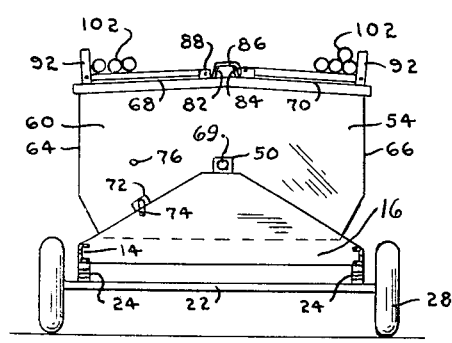
FIG. 4 is a front end elevation of my invention sectioned along lines 4—4 of FIG. 1.
Figure 5:
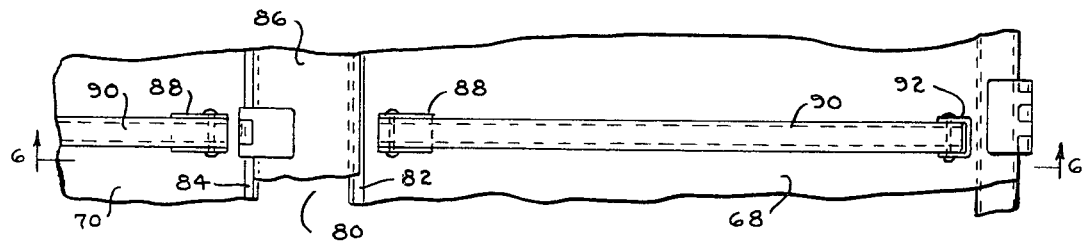
FIG. 5 is an enlarged plan view of a fragmentary portion of the cover doors.
Figure 7:
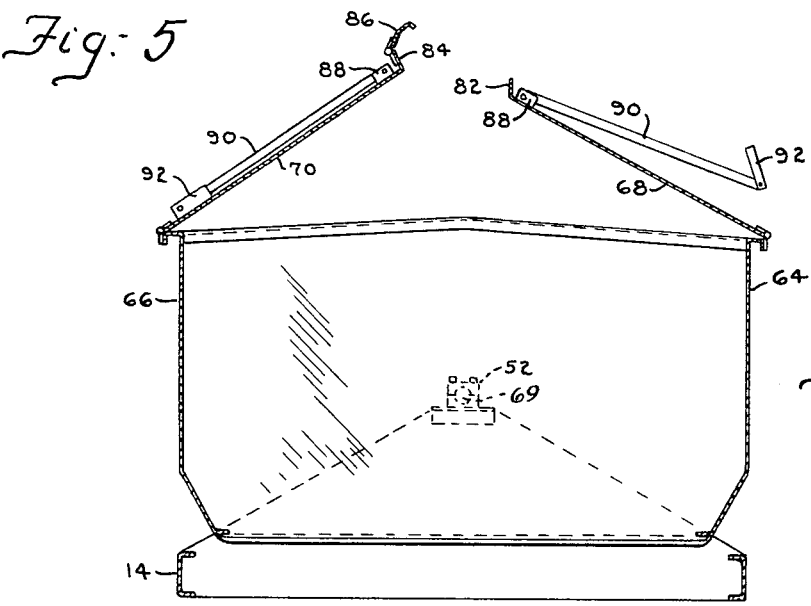
FIG. 7 is another end view of this invention in section showing the cover doors and hinged members connected thereto in opening position.

Referring now to the drawings, reference numeral 10 designates generally the storage apparatus of my invention. It comprises a frame 12 which is fabricated from channel bars 14 and front and back cross members 16 and 18 respectively to form rectangular frame 12. An axle 22 is supported from the bottom side of channel bars 14 by means of leaf springs 24 each thereof connected to each of the channel bars 14 in any convenient manner such as by means of "U" clamps 26. Wheels 28 are rotatably mounted on each end of axle 22 in the conventional manner. As shown more clearly in FIGS. 1 and 8, channel bars 30 and 32 are connected, by weldment for example, to the forward end of channel bars 14 extending therefrom horizontally and are angled to converge forming an apex in advance of rectangular frame 12 to provide drawbar means 34. Draw bar means 34 comprises a hitch socket member 36 and an upright tubular housing 38 which houses the liftable shaft 40 of a swivel support wheel 42. Crank means 44 is provided on the upright tubular housing 38 to effect the raising and lowering of shaft 40.

Inclined cross members 46 and 48 are connected to frame 12 so as to form a triangular beam structure for supporting pivot members in the form of journal type bearings 50 and 52 respectively.

Storage box 54 is generally rectangular in shape having a front wall 60, back wall 62, and side walls 64 and 66. As more clearly shown in FIG. 4 to 7, front and back walls 60 and 62 are centrally gabled slightly so that cover doors 68 and 70 hinged to side walls 64 and 66 rest on the gabled top edge of front and back walls 60 and 62 to provide a water shed incline. Front and back walls 60 and 62 are centrally provided with a stud shaft 69 and 71 respectively projecting exteriorally thereof which are pivotally supported in bearings 50 and 52 respectively by which means storage box 54 may be tilted toward either side. A lock bolt housing 72 is mounted on one of inclined cross members 46 preferably at the front end of rectangular frame 12 substantially spaced thereon from bearing 50. Lock bolt 74 is an operative component in housing 72 and may be provided with threads to engage a threaded hole in front wall 60. This hole is located in front wall 60 so as to be effective to lock storage box 54 in place in a level position when engageable with lock bolt 74. A second threaded hole 76 is located in front wall 60 at a position elevated from the hole used to hold the box in a level position, so as to be effective to lock storage box 54 in a tilt position.

The adjacent sides of cover doors 68 and 70 are spaced apart as at 80 and are upturned as at 82 and 84 respectively, the lengths thereof. Side 84 of said upturned sides is provided the length thereof with a hinged strip member 86 which bridges space 80 and overhangs the other of said upturned side 82. Also provided adjacent the closing sides of cover doors 68 and 70 spaced the length thereof are a plurality of brackets 88 to which are pivotally connected to each thereof a leg member 90. The distal end of each leg member 90 is provided with a hinged extension member 92 preferably formed from a channel bar to receive leg member 90 within the channelway thereof when extension member 92 is folded over leg member 90.

Figure 8:
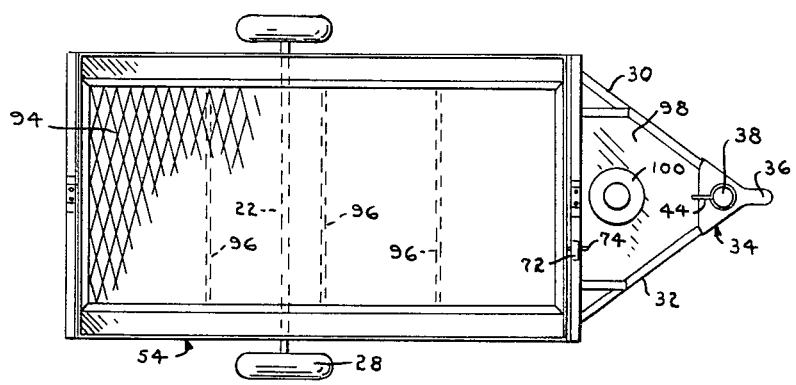
FIG. 8 is a plan elevation of this invention sectioned along lines 8—8 of FIG. 1.
Figure 9:
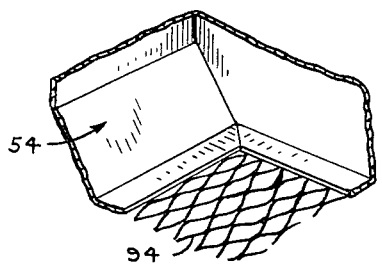
FIG. 9 is an enlarge detail of the box bottom cover in fragment illustrating the screen structure of the bottom thereof.

Storage box 54 has a perforated bottom 94 such as may be provided by screen panel 94 braced by rib members 96 as shown in FIGS. 8 and 9. It is understood of course that any type of bottom which provides the strength for support and also allows drainage and air circulation will be satisfactory. I also provide a platform 98 between 30 bars 80 and 32 which form the drawbar means 34 of my invention.

In the operation of my invention, the sectionally folded oil rake is packed and stored in storage box 54. The storage apparatus 10 of my invention is parked adjacent a slip or waterway or any place near the water where water pollution or oil spillage is likely to occur due to industrial activities. If, for example, oil spillage occurs nearby polluting the body of water, the storage apparatus 10 embodying my invention is either manually pushed or moved by vehicular drive means to the area adjacent the spillage. If feasible and the distance is substantial the trailer hitch 36 of storage apparatus 10 of my invention may be connected to a motor driven vehicle and the apparatus 10 may be so transported to the spillage area. Crank means 44 is operated to raise wheel 42 when it is desired to pull the apparatus 10 by motor drive means. When the trailer 10 is positioned for operation, crank means 44 is operated to lower wheel 42 to ground level so that the apparatus 10 is stabilized on at least three points. Lock bolt 74 is removed from its hole in the front wall 60 of storage box 54 freeing box 54 from its fixed level position and allowing manual tilting thereof, preferably toward the water. Lock bolt 74 is then inserted in threaded hole 76 to fix the storage box 54 in the tilt position. Cover door 68 located toward the water is opened to an approximate horizontal position at which time legs 90 of cover door 68 are pivoted away from the door to rest on the ground thereby providing support for horizontally extending cover door 68. Extension members 92 may or may not be pivotally extended since the function thereof is not solely to provide an increase in footing area. In the event the ground is soft and sinking of legs 90 in the ground occurs, extension members 92 may be pivotally extended to provide the increased footing area. With the storage box 54 tilted and cover door 68 supported in a horizontal position to provide a platform, the sectionally folded oil rake may be pulled therefrom easily and rapidly and placed into the water to confine the oil spillage or other pollutants.

The oil rake is utilized to collect and confine the oil or pollutant and keep it from spreading with the water movement. Other means are required to remove the oil or pollutant from the confines of the oil rake such as an oil skimmer or devices such as absorbent materials such as straw which are later collected from the water. Oil skimmer 100 is conventionally a manually portable, engine driven centrifugal pump. I provide platform 98 between channel bars 30 and 32 forming drawbar means 34 is provided for supporting oil skimmer unit 100 and allowing transportation thereof with the storage trailer 10 of my invention. It is designed to float on the water, the intake thereof being positioned to skim the surface of the water and remove the pollutants floating in the water. Hose sections 102 are assembled to form a continuous conduit which is connected to the outlet of skimmer unit 100. The discharge end of hose 102 is placed at a distant position on shore or in a sludge tank for receiving the pollutants pumped from the skimmer. When the cleaning operation is completed, hose sections 102 are disconnected and the skimmer unit is removed and placed on platform 98 on drawbar 34 and secured thereto for travel. The oil rake (not shown) is also removed from the water and folded into storage box 54. After the storage box is righted from the tilt position and locked by means of lock bar 74, cover doors 68 and 70 are closed and legs 90 of cover door 68 are pivoted to their folded position against cover door 68. Extension members 92 of legs 90 of both cover doors 68 and 70, however, are pivoted to their upwardly extending position to form side support posts to enable the use of the cover doors as a storage decking for oil skimmer hose sections 102 as partially shown in FIG. 4.

The storage apparatus 10 of my invention is transported to a cleaning station where adequate facilities are available for washing the entire apparatus without removing the contents therefrom. After the skimmer hose sections are cleaned, they are removed from the door covers 68 and 70 to allow door covers 68 and 70 to be opened for exposing the soiled oil rake to the wash shower. After the wash shower operation is completed cover doors 68 and 70 are closed over storage box 54 and skimmer hose sections 102 are replaced on the decking formed by the closed cover doors 68 and 70. The storage box apparatus 10 of my invention is removed from the washing station to its parking location for storage until the next use. After the washing operation is completed, complete drainage of the storage box 54 and the contents thereof is accomplished by means of screen bottom 94. Thorough drying is also obtained by air circulation through storage box 54 aided by vent means provided by space 80 between the closing edges of cover doors 68 and 70 and screened bottom 94.

I claim:

1. A mobile storage apparatus comprising:
a frame;
wheel means supporting said frame;
draw bar means connected to said frame for attachment to motive means;
spaced pivot members mounted on said frame in axial alignment;
a box mounted in said frame between said pivot members;
opposite side walls of said box having means for pivotal connection to said pivot members;
the bottom wall of said box being perforated substantially throughout; and
the top wall comprising cover doors hinged at the side walls of said box for uncovering said box, the abutting sides of said doors being spaced apart when closed to provide an opening for communicating the exterior of said box and the interior thereof, one of said doors being provided with a laterally extending strip member bridging said opening at a position vertically spaced over said doors.

2. The mobile storage apparatus of claim 1 wherein said cover doors are further characterized as having a leg member connected at one end thereof to said cover doors, said leg member being pivotally movable about said connection for extending to the ground when said cover door is opened for supporting said open door in a generally horizontal position.

3. A mobile storage apparatus comprising:
a frame;
wheel means supporting said frame;
spaced pivot members mounted on said frame in axial alignment;
a box pivoted mounted on said frame between said pivot members;
the bottom wall of said box being perforated substantially throughout;
the top wall of said box comprising cover doors for uncovering said box;
vent means in a wall of said box other than said bottom wall;
a leg member connected at one end thereof to said cover doors, said leg member laying against said cover doors in one position and being pivotally movable about said connection for extending to the ground in a second position for supporting said open door in a generally horizontal position when said cover door is opened; and
an extension member pivotally connected to the other end of said leg member movable upright to provide retaining means for retaining elongated articles stored on said cover doors of said top wall when said leg member is in said first position.

4. A mobile storage apparatus comprising:
a frame;
wheel means supporting said frame;
draw bar connected to said frame for attachment to motive means;
platform means provided on said draw bar means;
pivot members mounted fore and aft on said frame;
a box mounted in said frame between said pivot members;
opposite side walls of said box having means for pivotal connection to said pivot members on said frame;
a screen panel provided for the bottom wall of said box;

cover doors hinged to said walls of said box comprising the top wall thereof;

said cover doors being spaced apart at the adjacent sides thereof when said cover doors are closed providing an opening for communicating the exterior of said box and the interior thereof through said top wall;

a plurality of leg members connected at one end of each thereof to said cover doors;

a leg extension member connected to the other end of each of said leg members to pivotally extend normal of said leg members; and a strip member on one of said cover doors bridging said opening between said adjacent sides of said cover doors at a position vertically spaced over said cover doors.

* * * * *